US006065584A

United States Patent [19]

Bohn

[11] Patent Number: 6,065,584

[45] Date of Patent: May 23, 2000

[54] LOADING DEVICE FOR A PLATE PRESS

[75] Inventor: Hans Bohn, Schopfloch, Germany

[73] Assignee: Robert Burkle GmbH, Freudenstadt, Germany

[21] Appl. No.: 09/101,553

[22] PCT Filed: Nov. 11, 1997

[86] PCT No.: PCT/DE97/02628

§ 371 Date: Jul. 13, 1998

§ 102(e) Date: Jul. 13, 1998

[87] PCT Pub. No.: WO98/22268

PCT Pub. Date: May 28, 1998

[30] Foreign Application Priority Data

Nov. 16, 1996 [DE] Germany ........................... 196 47 480

[51] Int. Cl.[7] ..................................................... B65G 37/00

[52] U.S. Cl. ........................................................ 198/346.3

[58] Field of Search ............................. 198/346.3, 346.2, 198/626.1, 626.3, 626.5, 604, 606, 607

[56] References Cited

U.S. PATENT DOCUMENTS 6,009,990 1/1999 Davis .................................. 198/346.3

FOREIGN PATENT DOCUMENTS 28 25 296 12/1979 Germany .
28 47 273 5/1980 Germany .
30 01 010 7/1981 Germany .
35 03 156 1/1987 Germany .
39 14 866 11/1990 Germany .

*Primary Examiner*—Christopher P. Ellis
*Assistant Examiner*—Khoi H. Tran
*Attorney, Agent, or Firm*—Pillsbury Madison & Sutro

[57] ABSTRACT

A loading device for a plate press, composed of two loading supports which can be displaced perpendicular to a conveyance direction. Each loading support has at least one holding device with a conveyor belt which travels in the direction of conveyance. A workpiece to be processed is placed on the upper reach of the conveyor belt and is deposited by the conveyor belt in or on the press. The conveyor belt is moved in such a way that the relative speed of its upper reach in relation to a workpiece being conveyed is equal to zero for all states of movement of the assigned loading supports. As a result, no frictional movement occurs between the conveyor belt and workpieces being carried thereby.

6 Claims, 3 Drawing Sheets

LOADING DEVICE FOR A PLATE PRESS

This application is the national phase of international application PCT/DE97/02628 filed Nov. 11, 1997 which designated the U.S.

BACKGROUND OF THE INVENTION

1. Field of the Invention

The invention relates to the field of processing workpieces in a plate press, in particular the loading of this plate press for the purpose of producing tempered particle board. In this connection it is of particular interest how the deposition of such a workpiece, for example of the particle board to be worked, on the press is performed, since the transfer from the loading device to the press must take place in such a way that the workpiece to be processed takes up as exact a position as possible in the press. This is achieved as a rule in that the workpiece to be processed is not placed with its entire surface on the press, but instead first with one edge and then with the other edge in order to prevent air cushion-like effects which lead to the floating of the workpiece on the press and therefore make the mentioned exact positioning worse, or respectively impossible.

Various systems for achieving this are known.

2. Prior Art

A loading device in accordance with the species is described in DE 28 47 273 C3, wherein clamping strips are provided as holding devices, which are opened and pulled outward in the deposited position of the workpiece to be processed, so that the workpiece can fall downward into the press (as a rule on the lower steam plate). The friction occurring when displacing the workpiece out of these opened clamping strips is intended to be prevented or at least minimized by providing additional placement rollers, on which the workpiece to be processed is placed when the loading strips are moved apart.

Another system (DE 35 03 156 C1) has the provision of doing without additional holding devices, such as clamping strips, for example, in this case the workpiece to be processed rests directly on the loading strips which are provided with holes, through which the workpiece to be processed is drawn in during the conveying process and through which an air flow is blown upward toward the workpiece during the placement process so that the workpiece floats on an air cushion.

A similar system is known from DE 39 14 866, wherein the loading device consists of belt conveyors which are moved into the pressing chamber, so that the workpiece to be processed is supported on its longitudinal edges by the belts of this belt conveyor system and conveyed into the press. When depositing the workpiece in the press, the two conveyor belts are pulled toward the exterior so that the workpiece can fall downward on the lower steam plate. In order to prevent the workpiece from being displaced toward the one or the other side by the left or the right conveyor belt because of uncontrolled friction, rollers at the inside of these conveyor devices are pivoted upward so that friction between the belt conveyor and the workpiece is reduced. However, this system is very elaborate since large masses (conveyor devices) must be rapidly moved, which requires a correspondingly large acceleration with corresponding great outlay of force and devices suitable for this.

It is common to the described loading devices that in spite of the mentioned additional devices it is not or not sufficiently assured that no sliding friction is created between the workpiece and the specific system respectively used for conveying and depositing, which extends underneath the workpiece and supports it. It is necessary in connection with the three systems mentioned at the outset that the workpiece always first be deposited with one side so that no air cushions form, on which the workpiece can float. With all known systems this has the result that the loading strips must be moved outward one after the other when depositing the workpiece, i.e. the second loading strip can only start its release movement when the first loading strip has already left the area of the workpiece and the latter has reached the press with the appropriate edge. This means in turn that the second loading strip must be retracted over the entire release path in order to let the other side of the workpiece drop on the lower steam plate. As a function of the outlay in machines for letting these processes take place as rapidly as possible, a certain length of time remains in which the workpiece is in contact with the hot steam plate, while the other edge area is still supported by the second loading strip and therefore is held above the steam plate. However, in connection with specific work processes in particular, for example when pressing resin-soaked papers which form a layered package, it is desirable to keep this length of time as short as possible, because otherwise processes will occur in the layered package (for example pre-condensation), which reduce the even quality of the workpiece.

BRIEF SUMMARY OF THE INVENTION

It is therefore the object of the invention to further develop the loading device in accordance with the species in such a way that in the course of depositing the workpiece, for example a layered package, on the steam plate, no sliding friction occurs, furthermore this loading device should be designed mechanically simple.

In accordance with the invention this object is attained in accordance with the characterizing portion of claim 1.

It is not assured by the embodiment of the holding devices as "small" conveyor belts that no relative friction at all occurs between the upper side of these conveyor belts and the underside of the workpiece respectively to be processed, so that therefore no mispositioning can occur when depositing the workpiece on the press. In accordance with a particularly advantageous further embodiment of this attainment of the object it is provided to mechanically couple these conveyor belts with the movement of the loading strips in such a way, that the circumferential speed of the two deflection rollers supporting the conveyor belt has been selected such that during a movement of the loading strips the upper side of the conveyor belts moves in the opposite direction at the same speed, so that as a result the absolute speed of a point on the conveyor belt, and therefore also the relative speed in respect to the resting workpiece, equals zero.

The attainment of the object in accordance with the invention makes it possible in particular to control the two loading strips in such a way, that in the course of depositing the workpiece on the lower steam plate of the press they cause the tilt-like deposition movement of the workpiece on the press, which is necessary for the reasons explained at the outset, to be laterally minimized, so that the desired contact of the entire surface of the underside of the workpiece with the steam plate is provided in the shortest time possible.

BRIEF DESCRIPTION OF THE SEVERAL VIEWS OF THE DRAWING

The attainment of the object of the invention will now be explained by means of the drawings. Shown are in.

DETAILED DESCRIPTION OF THE INVENTION

The loading device in accordance with the invention is used for loading a press 10 (FIGS. 4, 5), of which only the lower portion with the lower steam plate 1 is represented. It is intended to convey the workpiece 8 to this lower steam plate from its position outside of the press and to deposit it there in as exact a position as possible. To this end, first a holding frame 2 is provided which, in its position where it is moved inside the press, extends on both sides of the lower steam plate 1 and on which the loading device with its individual components is maintained.

Figure 1:
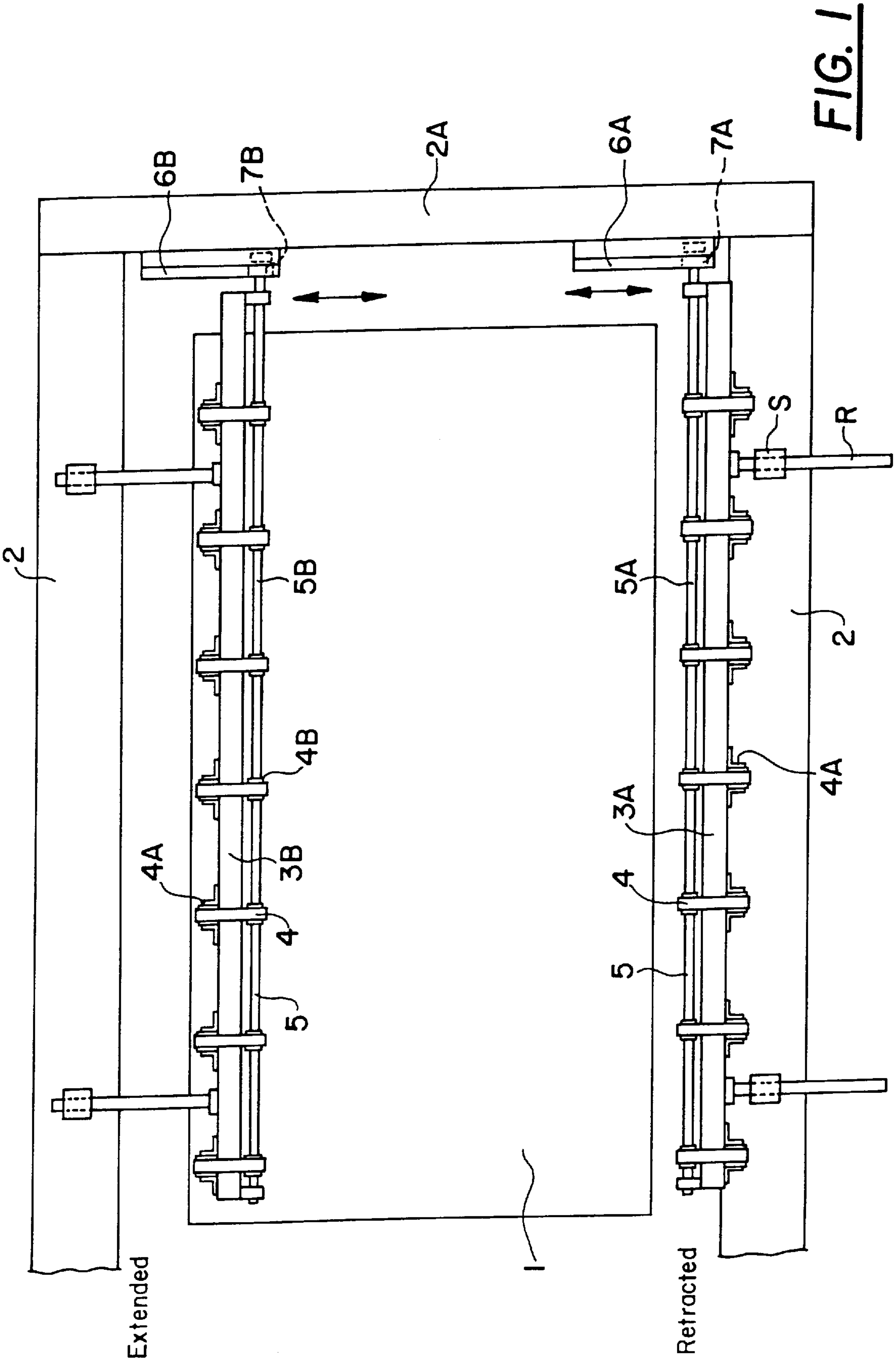
FIG. 1, a schematic top view of the loading device in accordance with the invention, FIG. 2, a partial top view of a corner area of the loading device in FIG. 1, FIG. 3, a vertical section through a partial area of the loading device, FIG. 4, a vertical section through the press with the loading device in accordance with the invention shortly before the deposition of the workpiece on the lower steam plate, and FIG. 5, a vertical section corresponding to FIG. 4 in the course of placing the workpiece into the press.

The essential components of this loading device are two loading strips 3A, 3B, which are displaceable parallel with the longitudinal sides of the holding frame 2. In the top view in FIG. 1, the loading strip 3A is represented in the retracted position, i.e. it does not project over the lower steam plate 1, while the loading strip 3B is represented in the extended position, i.e. it projects over the lower steam plate 1. For guidance, the loading strips 3A, 3B are connected in a known manner with the holding frame 2 by respectively two pipes or rods R, which are seated in appropriate receptacles S of the holding frame. On their ends facing toward the interior of the press, the rods R of the loading strips 3A, 3B support holding devices, on which the workpiece to be processed rests when both loading strips are in the extended position (FIG. 5) in which they can also convey the workpiece 8 from a loading station into the press 10.

Figure 3:
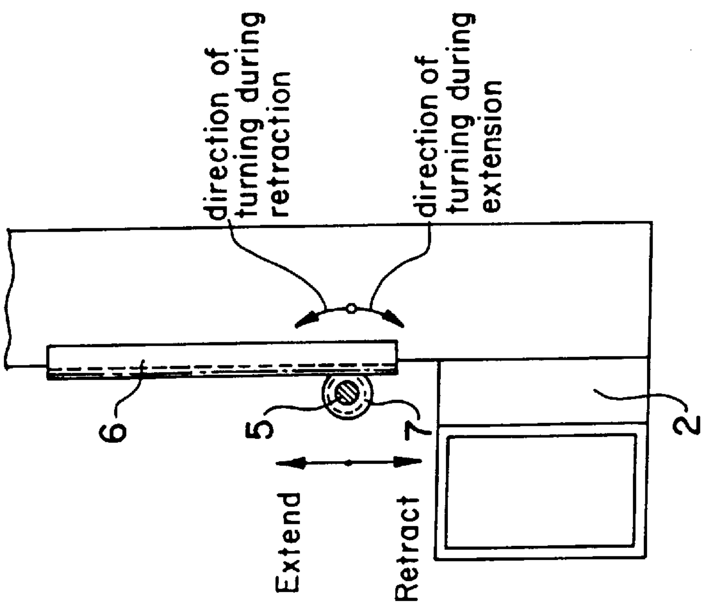
Figure 2:
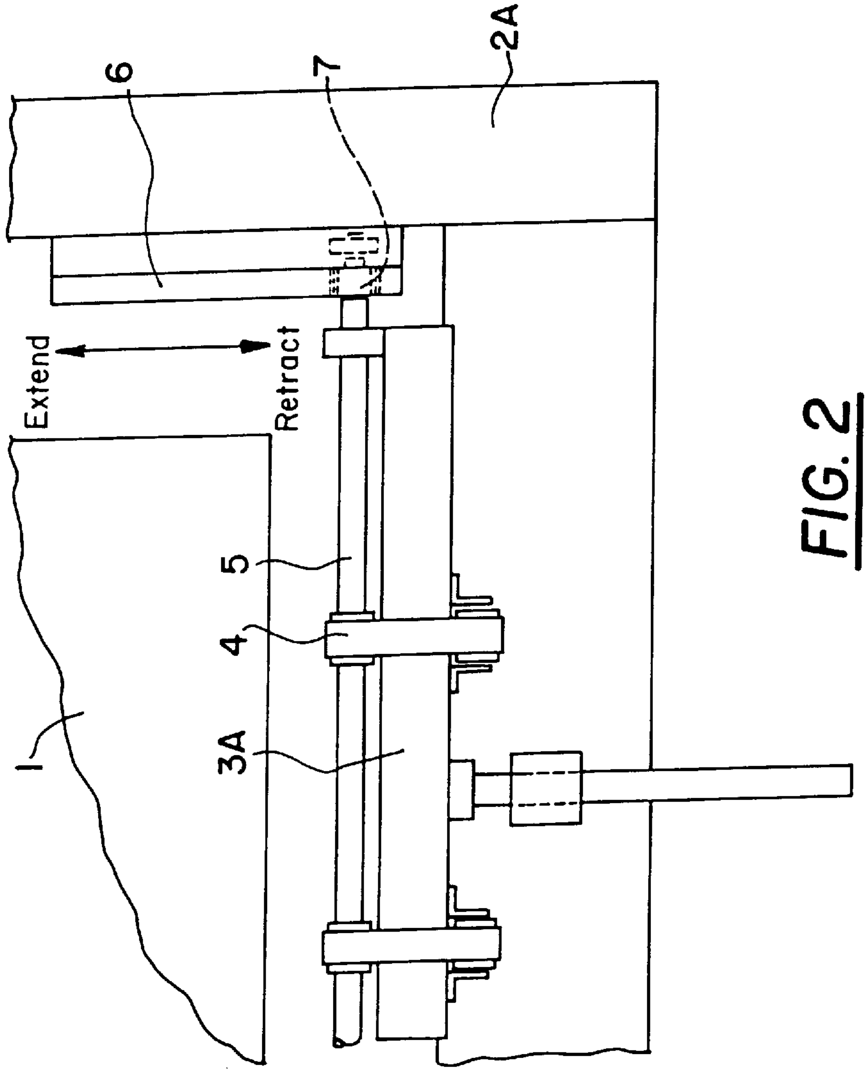

The holding devices consist of several conveyor belts 4, whose upper side is conducted over the loading strips 3A, 3B. To this end a deflection roller 4A is provided on the outward facing narrow side of the loading strips 3A, 3B, on the inward facing front side of the loading strips 3A, 3B the conveyor belts 4 are conducted over a common driveshaft 5. A toothed rack 6A, 6B, which meshes with a gear wheel 7A, 7B at the end of the driveshaft 5A, 5B, is mounted on the front end 2A for driving this driveshaft 5. The functioning of this drive is represented in FIG. 3:

The diameter of the gear wheel 7 has been selected such that the conveyor belts 4 convey opposite to the movement of the loading strips 2 at the same speed at which the loading strips move toward the outside, so that the movement of the loading strips 3A, 3B does not lead to any friction between the upper side of the conveyor belts 4 and the underside of the workpiece 8, regardless of the speed or direction of movement of the loading strips.

A typical sequence of movements of the loading device in accordance with the invention takes place as follows:

First, the holding frame 2 is located outside of the press in a loading station,, where the loading strips 3A, 3B move underneath the workpiece for taking it over from other conveying devices, for example a roller conveyor.

Figure 5:
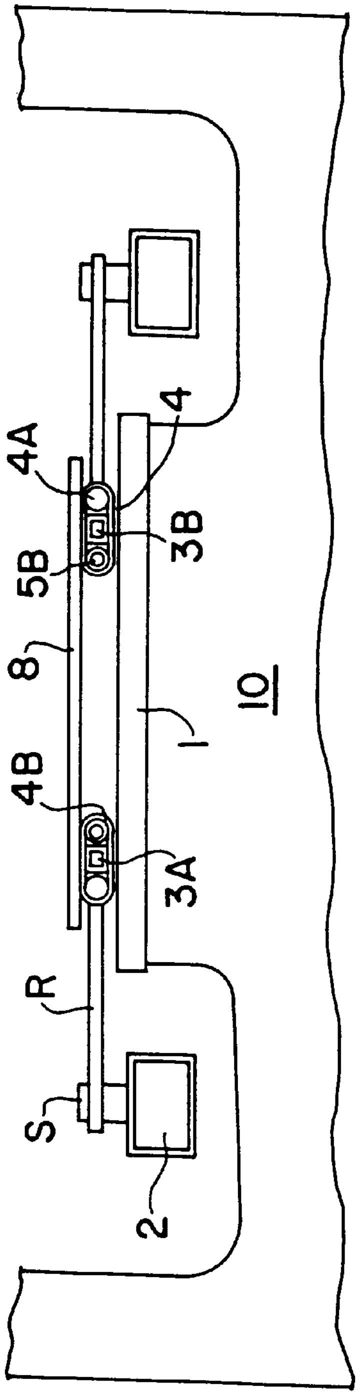

Thereafter the holding frame 2 is moved into the press 10 until it assumes the desired position in which the workpiece 8 is located above the steam plate 1 and is held by the extended loading strips 3A, 3B, this position is represented in FIG. 5.

Figure 4:
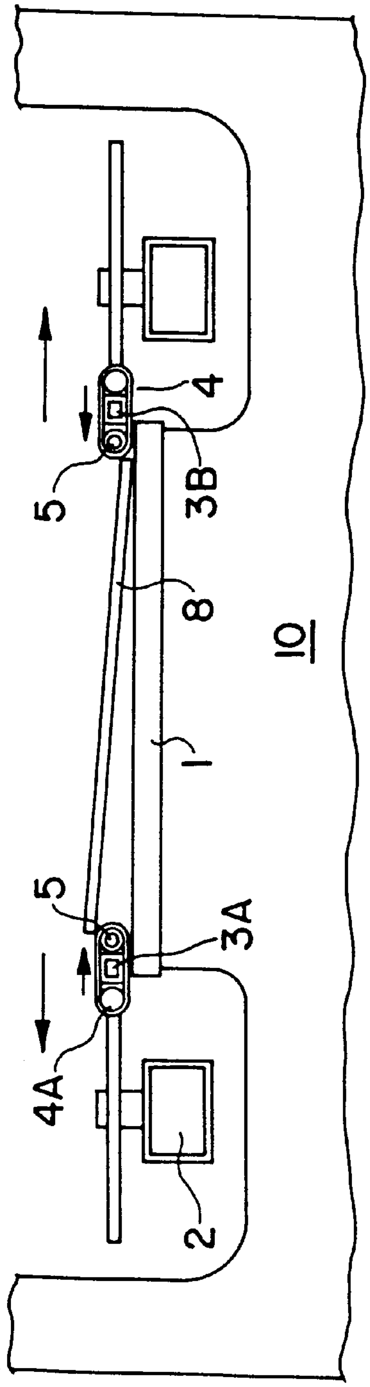

Then the deposition of the workpiece 8 on the lower steam plate 1 is started in that the two loading strips 3A, 3B are retracted with a slight time delay (large arrows in FIG. 4), wherein, in accordance with the above described force coupling of the drive of the conveyor belts 4, the upper side of these conveyor belts moves in the opposite direction (small arrows) at the same speed with which the loading strips are retracted, so that no relative movement and also no friction can be generated between the upper side of the conveyor belts on the one hand and the underside of the workpiece 8 on the other. In the represented exemplary embodiment in FIG. 4, the loading strip 3B slightly precedes the loading strip 3A, so that the longitudinal side of the workpiece 8, which is on the right in FIG. 4, is already deposited on the lower steam plate 1, while the corresponding left longitudinal edge is just being held in the end area of the conveyor belts 4 above the steam plate 1. It can be clearly taken from FIG. 4 that at the appropriate retraction speed of the two loading strips the length of time between the deposition of the right longitudinal edge and the deposition of the left longitudinal edge of the workpiece 8 can be kept at a minimum.

In the represented exemplary embodiment, the described toothed rack/gear wheel combination is preferred as the mechanical force coupling of the conveyor belts 4 with their associated loading strips 3A, 3B, however, just the same it is also possible to achieve this sequence by means of an extended chain with chain wheels, or also by means of belts and belt pulleys.

What is claimed is:

1. A loading device for a plate press with conveying devices, which extend underneath the workpiece to be processed, for which purpose it comprises two loading strips which can be displaced perpendicularly in respect to the conveying device, each of which respectively contains at least two holding devices, by means of which the workpiece to be processed is held and deposited in the press, characterized in that the holding devices consist of conveyor belts (4), which are arranged in the displacement direction of their associated loading strips (3A, 3B), on whose upper sides the workpiece (8) to be processed rests in the extended position of the loading strips (3A, 3B), and that the conveyor belts (4) are moved or controlled in such a way that the relative speed of the respectively upper sides in respect to the workpiece (8) equals zero in all movement states of its associated loading strip (3A, 3B).

2. The loading device in accordance with claim 1, characterized in that the movements of the conveyor belts (4) are mechanically force-coupled with the movement of the associated loading strip (3A, 3B).

3. The loading device in accordance with claim 2, characterized in that a toothed rack (6A, 6B) is provided for force coupling, which is arranged at the front end (2A) of the holding frame (2) of the loading strips (3A, 3B) and which meshes with a gear wheel (7) which is fixedly connected with the common driveshaft (5A, 5B) of the conveyor belts (4) of a loading strip (3A, 3B).

4. The loading device in accordance with claim 1, characterized in that the conveyor belts (4) run on two deflection rollers (4A, 4B) which are held on both sides of the associated loading strip (3A, 3B), one of which is seated on a driveshaft (S).

5. A loading device for a plate press with conveying devices, which extend underneath the workpiece to be processed, for which purpose it comprises two loading strips which can be displaced perpendicularly in respect to the conveying device, each of which respectively contains at least two holding devices, by means of which the workpiece to be processed is held and deposited in the press, characterized in that the holding devices consist of conveyor rollers or conveyor cylinders, which are arranged in the displacement direction of their associated loading strips (3A, 3B), on whose upper sides the workpiece (8) to be processed rests in the extended position of the loading strips (3A, 3B), and that the conveyor rollers or conveyor cylinders are force-coupled with the movement of the loading strip in such a way that the relative speed of their respectively upper sides in respect to the workpiece (8) equals zero in all movement states of its associated loading strip (3A, 3B).

6. A method for operating the loading device in accordance with claim 1, characterized in that the deposition of the workpiece (8) to be processed in the press (10) takes place in such a way that the two loading strips (3A, 3B) are controlled with a time delay which is of such a size that both loading strips (3A, 3B) are retracted almost simultaneously while the conveyor belts (4) of both loading strips (3A, 3B) extend underneath the workpiece (8).

* * * * *